United States Patent
Salas et al.

(10) Patent No.: US 7,179,082 B2
(45) Date of Patent: Feb. 20, 2007

(54) PROCESS AND APPARATUS FOR INNER WALL TOASTING OF CASKS FOR WINE GUARD BY HOT AIR CONVECTION

(76) Inventors: Alejandro Fantoni Salas, Avenida Libertalores N 53, Colina, Santiago (CL); Adolfo Fernandez Mesa, Lautaro N 2011 Chilieura, Santiago (CL)

( * ) Notice: Subject to any disclaimer, the term of this patent is extended or adjusted under 35 U.S.C. 154(b) by 687 days.

(21) Appl. No.: 10/674,584

(22) Filed: Sep. 29, 2003

(65) Prior Publication Data

US 2004/0191383 A1  Sep. 30, 2004

(30) Foreign Application Priority Data

Oct. 10, 2002 (CL) ................................ 2322-2002

(51) Int. Cl.
*F26B 25/06* (2006.01)
(52) U.S. Cl. ................ 432/9; 34/104; 34/105
(58) Field of Classification Search ............ 432/9, 432/55, 266; 34/104, 105
See application file for complete search history.

(56) References Cited

U.S. PATENT DOCUMENTS 2,185,206 A   1/1940 Little
2,507,685 A   5/1950 Wilde
5,271,161 A * 12/1993 Brinck, II .................... 34/438
5,630,265 A   5/1997 Stone

FOREIGN PATENT DOCUMENTS

JP       10217889      2/2000

* cited by examiner

*Primary Examiner*—Gregory Wilson
(74) *Attorney, Agent, or Firm*—Gottlieb, Rackman & Reisman

(57) ABSTRACT

A process and apparatus for inner wall toasting of casks for wine guard by hot air convection, with controlled temperature which allows setting desired cask heating time and temperature. The process comprises: (a) connecting the inside of the cask to mechanical elements to form a hermetic toasting chamber wherein no aromatic compounds are liberated to the outside; (b) circulating an air stream within said chamber; (c) directly or indirectly heating said air stream to a temperature varying from 140° C. to about 230° C.; (d) directing said air stream to the inner cask walls; (e) capturing said air stream at the cask outlet; (f) directly or indirectly reheating said captured air stream to a temperature between 140° C. to about 230° C.; (g) recycling said reheated air stream to the inner cask walls; and (h) maintaining stage (g) for a required time to achieve the desired temperature and/or toasting.

26 Claims, 1 Drawing Sheet

PROCESS AND APPARATUS FOR INNER WALL TOASTING OF CASKS FOR WINE GUARD BY HOT AIR CONVECTION

FIELD OF THE INVENTION

The present invention relates to a process and apparatus for inner wall toasting of casks for wine guard by hot air convection, with controlled temperature which allows setting the desired cask heating time and temperature.

STATE OF THE ART

Oak casks use for wine guard is a very old tradition. Nevertheless, since many years to date the cask is used not only as a mere container, but also as a favourable element to wine industry, influencing the chemical and organoleptic parameters of white and red wines during vinification and aging.

Vinification and Aging of wines in oak casks allows generating color and aromas changes thereof that has been appreciated by the consumers; these changes are produced by several components extracted from the wood.

Oak wood delivers aromatic compounds to wine such vanilla, flowery, smoky and spicy, e.g. peppery, nuances thereto.

Traditionally, casks were manually heated with red-hot coal or fine-wood fire heat in a large shallow pan, to reduce wood resistance and bend it without breaking the staves, allowing setting metal bands in place; nevertheless, actually heat intensity regulation is used to modify wood composition, which is a very recent application.

Oak wood toasting level determines concentration of many wine-extractable compounds. Nevertheless, this level is visually determined by cask makers, generating a non-uniform toasting, without a real determination of actual aromatic compounds generated at different toasting levels. Woods with same toasting level manufactured by the same cask maker may vary considerably in their volatile compound liberation.

Wood heating optimization and rationalization will allow providing a better reproducibility, perfectly controlling toasting temperatures. Therefore, it is desired to design systems that allow maximizing the coupling quality between wine and wood.

As stated before, cask makers simply heat casks while putting galvanized metal bands in place, to reduce wood resistance and avoid stave breaking during bending. Heating intensity regulation, used to modify the chemical composition of the inner wood face, seems to be a very recent operation. Therefore, it was not precisely described in old texts (half of XIX$^{th}$ century) describing wine casks. This operation is inspired on cognac aging in wood casks.

Many studies about cask quality show a big interest on this stage (Chatonnet et al., 1989 a and b; Chatonnet et al., 1991). When the outer layer of the internal face is toasted, the wood suffers a modification of its physicochemical composition. Toasting intensity is more important than toasting duration. Some compounds initially present in non-toasted wood are derived by degradation of sugar polymers (cellulose, hemicellulose) or wood phenols (lignin). Furanic aldehydes and their derivatives have roasty odours derived from thermal degradation of polyosides. Their concentration increases to a maximum with medium toasting (10 minutes of toasting). Phenolic aldehydes, and mainly vanillin, provide a nice vanilla odour. These compounds are directly derived from lignin and reach their maximum near medium toasting. Volatile phenols have spicy and smoky odours. Non-toasted wood already has some phenols, like eugenol, but toasting produces lignin in large amounts. Concentration evolution varies according to the molecule, but in general the amount increases until strong toasting (15 minutes of toasting) and then it gradually decreases. Only some phenylketones, less aromatic substances produced from lignans, increase regularly until strong toasting (more than 20 minutes). Therefore, they could be considered as the real "makers" of toasting intensity.

Nevertheless, heating intensity is traditionally manually achieved using red-hot coal or fine-wood fire heat, in a large shallow pan more or less evenly fed with wood residues, varying from one cask maker to another. There is always a standardization problem with this operation.

Since 1988, SEGUIN MOREAU has undertaken a research program in the field of toasting operations control in casks making, due to its worries about production standardization and quality. Accurate thermal parameters of traditional toasting (Chatonnet et al., 1989 a) and thermal degradation of wood (Chatonnet et al., 1989 b) having been discovered, an optimal toasting system which produce homogeneous and regular results in all cases has been attempted to implement. After many years of research and attempts with several prototypes, an industrial tool has been perfected.

The main conserved functions follow:

The automatic toasting regulation system must not produce a different toasting from the traditional one. The system must reproduce, as well as possible, the different wood reactions when applying a thermal program similar to manual toasting.

The thermal source must be stable, easily controllable, reliable and safe, and free of potential secondary products. Accordingly, all combustion-based sources were eliminated. Infrared beams emitted by an electrical resistance were used, and the toasting intensity is controlled by an electrical rheostat.

The system must be automatic and regulated. All the regulated toasting system is directed by programmable automatization. Empiric programs allow operation time, toasting intensity, and humidifier frequency regulation. The future version of this process will maintain wood at a continuous temperature, capturing infrared beams and programming temperature in memory.

The system perfected by the University of Bordeaux is made up by the following elements:

The heating nucleus is constituted by a series of radiant electrical resistances, vertically disposed over a refractory support. A circular humidifier, placed at the base of the heating nucleus, provided with regulated pressure water, allows a constant volume for each electronic valve. A fixed metallic lid hosts the array of pieces and blocks the cask base during toasting. The heating nucleus is fixed over a pneumatic elevator. The heating nucleus position in the base is controlled by an optical-electronic device (an electrical eye).

The heating plate is covered by a non-radiant isolating refractory layer. The cask-holding plate rotates (20 revolutions/minute) to produce an even toasting. Rotation initiates at the beginning of each toasting cycle and does not stop until the end.

The control system is constituted by a module regulating the thermal source and a programmable function which controls all the components in the system and the operation chain by means of an internal clock. The future system will have continuous temperature with thermostat-controlled infrared beams.

The toasting system is used after the traditional stave bending in a bonfire. The base is supported over the plate, and the heating nucleus is in vertical position. From the beginning of the cycle, the plate starts to rotate, the heating nucleus descends to the working position and toasting begins. The toasting cycle is periodically interrupted by an ascending movement of the heating nucleus. A fine drizzle of water then circulates guaranteeing a constant humidification of the cask. Number of cycles, their duration, beam intensity from the heating nucleus, and humidifying are totally controllable. At the end of the program, the heating system stands in a vertical position allowing unloading of the cask and a new recently mounted cask to be loaded.

There is no considerable productivity gain with this system, and the energy source is still a very expensive one. Notwithstanding, the reproducibility of the work is guaranteed.

Many other attempts have been made to improve cask toasting for wine fermentation and guard. U.S. Pat. No. 5,630,265 (Stone) issued on Feb. 20$^{th}$ 1997 and Japanese Patent 2000043007 (Suntory Ltd.) issued on Feb. 15$^{th}$ 2002 show two apparatus to treat casks for wine guard which are toasted by means of electrical heaters placed within the cask.

These systems have the same disadvantages than the system created by the University of Bordeaux, which is expensive and has no increase in productivity.

BRIEF DESCRIPTION OF THE DRAWINGS

The enclosed drawing, which is included to provide a better understanding of the invention, being incorporated as constituting part of this description as an embodiment thereof, and altogether with the description, serve to explain the principles of the invention.

SUMMARY OF THE INVENTION

Figure 1:
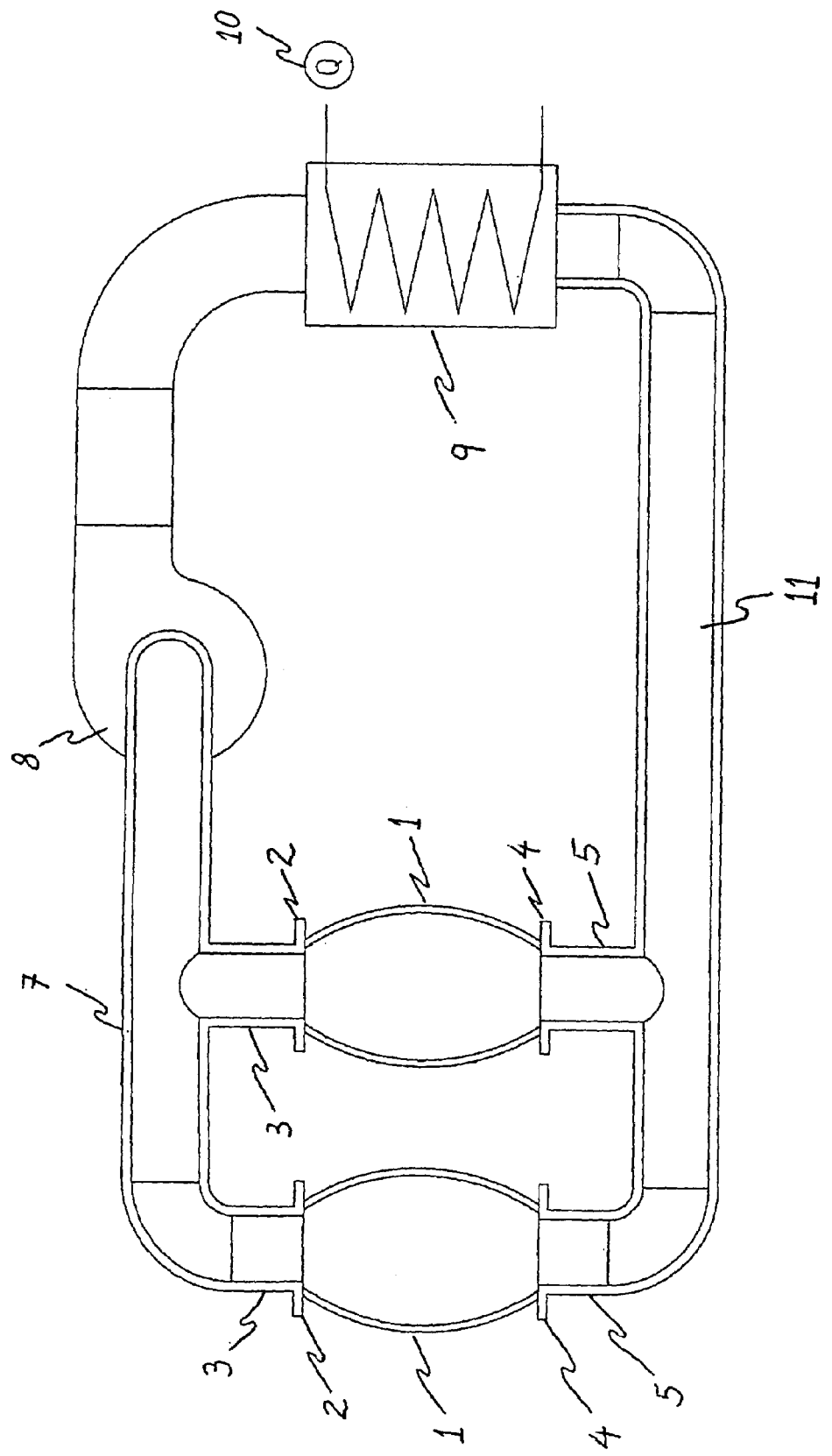
FIG. 1 shows a schematic diagram of the devices which are associated to the apparatus of the invention serving to carry out the process of the invention.

The present invention relates to a new system for cask toasting which is carried out by hot air convection, with controlled temperature, which allows setting the desired cask heating time and temperature, causing a chemical change similar to the change produced by direct fire, but with some fundamental differences for the product, as the following:

a) Wood temperature never surpasses that of hot air, totally avoiding carbonization by exposure to higher temperatures, over 800° C., that produce wood combustion.
b) By exposure to selected temperatures, below carbonization temperature, for longer times, it is possible to achieve a larger penetration of the thermal change into the wood, without surface damage.
c) Heat transmission by traditional radiation depends on many parameters, as distance from the heat source, source temperature to the fourth power, and visual position of the heating source from the inside of the cask, causing the heat contribution to be difficult to control, so affecting the process in a variety of different ways in the different zones where it takes place. Otherwise, the new process with heating by convection depends solely on gas temperature (lineally) and on the speed at which said gases sweep inner cask surface, both easily controlled factors.
d) Toasting conditions are much more easily reproducible than in the traditional system, therefore providing a greater regularity in toasting results and homogeneity between all produced casks.

These factors make this system more efficient for wine maker industry than the traditional one and, from a chemical point of view, they add large benefits subsequently transmitted to wine, which could be repeatable in time.

The inner part of the cask body being part of a hermetic environment during the process is the main feature of this process, where no liberation of aromatic components to the outer environment and no carbonization take place, which are undesirable processes.

Air initially admitted into the process is not contaminated with combustion products, but nevertheless it saturates with aromatic components from the wood of the inner cask wall during its recirculation. This recycled saturated air allows no loss of aromatic gases originated from the inner cask wall wood, maintaining said inner wall its intact properties to communicate them to wine during the guard process.

Regarding the aforementioned, we may mention:

Temperature and time control allow achieving a perfect toasting homogeneity, without alterations, guaranteed by a constant aromatic compound delivery, with no appreciable differences between one cask batch and another, or between one year and another, thus facilitating the Oenologist's work in the cellar, because it guarantees quality over time.

Owing to this system, toasting depth may be three orders of magnitude larger than toasting depth achieved in the traditional system, which guarantees a larger useful life for this product, achieving also friendlier and rounder tannin for taste, due to a larger polymerization of phenolic compounds in the inside, thus obtaining softer and more rounded wines.

This toasting system exploits the potentiality of aromatic compounds, resulting in larger concentrations of compounds such as phenolic aldehydes, mainly vanillin, other compounds as volatile phenols, such as eugenol, furanic aldehydes and others, which provide high quality woods rich in desired aromas for wines.

Owing to the perfect cask toasting level control, it is possible to select and guide the process towards more of an aromatic compound or another, according to the wine to be aged, improving the organoleptic features of the wine.

According to the hereinabove description, the process of the present invention is constituted by the following stages:

a) connecting the inside of the cask to mechanical elements forming a hermetic toasting chamber wherein no aromatic compounds are liberated to the outside;
b) circulating an air stream within said chamber;
c) directly or indirectly heating said air stream to a temperature varying from 140° C. to about 230° C.;
d) directing said air stream to the inner cask walls;
e) capturing said air stream at the cask outlet;
f) directly or indirectly reheating said captured air stream to a temperature between 140° C. to about 230° C.;
g) recycling said reheated air stream to the inner cask walls; and
h) maintaining stage (g) for a required time to achieve the desired temperature and/or toasting.

In stages (d) and (g) the air stream may be either directed parallel to cask walls or as a whirl, using a spiral flow. This air recycle allows gases issuing from the heated cask staying in the recycle stream, therefore saturating said stream with gases in a determined time and inhibiting their further transference from wood to said stream, thus maintaining the cask properties as intact as possible.

Inner cask wall heating may be carried out in a number of ways using this process, according to toasting and desired cask properties to be obtained. As an example, temperature may be stepwise risen in the range between 140° C. to about 230° C. In addition, lineally rising the temperature in the same range may be an alternative. These different variations in temperature application are directly related to hot air stream recycling time towards the inner cask walls.

Alternatively, the hermetic chamber formed within the cask may have means to make it rotate around its symmetry axis, which produces a spiral stream effect when air is circulated parallel to inner walls.

Likewise, temperature control is performed in process stages (c) and (f), which allows achieving the desired toasting.

It is also possible to isolate the cask outer wall, allowing heat transference to be controlled together with temperature control, providing the desired toasting depth and level.

The apparatus to carry out the cask toasting process by convection comprises:
a) connecting means to connect a cask with mechanical elements to maintain a hermetic environment within;
b) circulating means to circulate an air stream, within said hermetic environment;
c) heating means to heat said air stream;
d) controlling means to control the temperature of the air to be introduced into the casks;
e) circulating means to circulate said hot air stream into the cask, from an inlet to an outlet, wherein said hot air stream circulates over the inner cask walls; and
f) capturing means to capture air from the cask outlet and to recycle it to the cask inlet.

Mechanical elements used in this apparatus may be circular metallic plates having a central hole to which inlet and outlet ducts are connected. The cask may be connected to metallic plates using coupling elements well known in the art.

Circulating means to circulate an air stream into the chamber formed by the cask and the mechanical elements may be traditional blowers.

Air may be directly heated through a clean fuel burner or through electrical resistances, or else indirectly through a heat exchanger.

In the process, temperature may be controlled by heat flow regulation. This may be done by controlling fuel admission to the burner, when heating is direct, by voltage variation, when heating is carried out by electrical resistances, and by thermal fluid amount or temperature in a heat exchanger, when heating is indirect.

Capturing and recycling means to capture and recycle air in the process may simply be a duct placed at the cask outlet and a connecting duct between the heat source and the cask inlet.

The invention is not limited to the former description and it may be extrapolated to a number of ways to carry it out, for example toasting a number of casks at a time. This may be achieved by connecting a number of casks with a number of corresponding mechanical elements forming a number of hermetic chambers, which may be connected in series or parallel, to take advantage of the same air stream.

The process and apparatus of the present invention generate no environmental pollution, contrary to the traditional toasting system with coal or wood fire, as the heating means, either a direct flame burner or a heat exchanger, evacuate no coal or wood combustion products.

As shown in FIG. 1, casks (1) are bound by circular plates (2, 4) with connected inlet and outlet ducts (3, 5) for the air, thus forming hermetic chambers within inner cask walls (1). The system may have a duct (7) which allows connecting two or more casks to simultaneously perform the toasting process. A blower (8) draws air in and directs it to a heater (9) which heat intensity is regulated by a control element (10). Air at the desired temperature is recycled by duct (11) towards inlet means to the hermetic chamber, which are duct (5) and circular plate (4). The process is repeated until required toasting is attained in each cask.

The invention claimed is:

1. A process to carry out toasting of casks for wine guard, comprising following stages:
a) connecting the inside of the cask to mechanical elements forming a hermetic toasting chamber wherein no aromatic compounds are liberated to the outside;
b) circulating an air stream within said chamber;
c) directly or indirectly heating said air stream to a temperature varying from 140° C. to about 230° C.;
d) directing said air stream to the inner cask walls;
e) capturing said air stream at the cask outlet;
f) directly or indirectly reheating said captured air stream to a temperature between 140° C. to about 230° C.;
g) recycling said reheated air stream to the inner cask walls; and
h) maintaining stage (g) for a required time to achieve the desired temperature and/or toasting.

2. A process to carry out toasting of casks for wine guard according to claim 1, wherein said air stream may be circulated parallel to cask walls on stages (d) and (g).

3. A process to carry out toasting of casks for wine guard according to claim 1, wherein said air stream may be circulated as a whirling spiral stream on stages (d) and (g).

4. A process to carry out toasting of casks for wine guard according to claim 1, wherein said cask rotates together with said mechanical elements on stage (a).

5. A process to carry out toasting of casks for wine guard according to claim 1, wherein temperature may be stepwise risen to a temperature in the range between 140° C. and about 230° C.

6. A process to carry out toasting of casks for wine guard according to claim 1, wherein temperature may be lineally risen to a temperature in the range between 140° C. and about 230° C.

7. A process to carry out toasting of casks for wine guard according to claim 1, wherein the different variations of temperature application are directly related to hot air stream recycling time towards inner cask walls.

8. A process to carry out toasting of casks for wine guard according to claim 1, wherein a number of casks are connected to a number of mechanical elements to form a number of hermetic chambers on stage (a).

9. A process to carry out toasting of casks for wine guard according to claim 8, wherein casks are connected in parallel on said stage (a).

10. A process to carry out toasting of casks for wine guard according to claim 8, wherein casks are connected in series on said stage (a).

11. An apparatus to carry out a convective toasting process of casks for wine guard, which comprises:
a) connecting means to connect a cask with mechanical elements to maintain a hermetic environment within;
b) circulating means to circulate an air stream, within said hermetic environment;
c) heating means to heat said air stream;

d) controlling means to control the temperature of the air to be introduced into the casks;

e) circulating means to circulate said hot air stream into the cask, from an inlet to an outlet, wherein said hot air stream circulates over the inner cask walls; and capturing means to capture air from the cask outlet and to recycle it to the cask inlet.

12. An apparatus according to claim 11, wherein said means (e) allows said air stream to circulate parallel to inner cask walls.

13. An apparatus according to claim 11, wherein said means (e) allows said air stream to circulate as a whirling spiral stream.

14. An apparatus according to claim 11, wherein said means (a) allow the cask rotating together with said mechanical elements.

15. An apparatus according to any of claim 11, wherein said means (a) allow connecting a number of casks to a number of mechanical elements to form a number of hermetic chambers.

16. An apparatus according to claim 15, wherein said casks are connected in parallel.

17. An apparatus according to claim 15, wherein said casks are connected in series.

18. An apparatus according to claim 11, wherein said used mechanical elements are circular metallic plates having a central hole to which inlet and outlet ducts are connected, wherein said cask may be connected to said metallic plates using coupling elements well known in the art.

19. An apparatus according to claim 11, wherein said circulating means to circulate air into the chamber formed by said cask and said mechanical elements, are blowers.

20. An apparatus according to claim 11, wherein said air may be directly heated by a clean fuel burner.

21. An apparatus according to claim 20, wherein said temperature may be controlled by regulating heat flow, which may be done by controlling fuel admission to the burner.

22. An apparatus according to claim 11, wherein said air may be directly heated by an electrical heater.

23. An apparatus according to claim 22, wherein said temperature may be controlled by regulating heat flow, which may be done by controlling electrical heater power.

24. An apparatus according to claim 11, wherein said air may be indirectly heated by a heat exchanger.

25. An apparatus according to claim 24, wherein said temperature may be controlled by regulating heat flow, which may be done by controlling thermal fluid amount or temperature in said heat exchanger.

26. An apparatus according to claim 11, wherein said capturing and recycling means are ducts placed at the cask outlet and connecting ducts between the heat source and the cask inlet.

\* \* \* \* \*